United States Patent [19]
Michellone

[11] 3,756,661
[45] Sept. 4, 1973

[54] ANTI-SKID BRAKING SYSTEM FOR TOWED VEHICLES

[75] Inventor: Giancarlo Michellone, Cambiano, Italy

[73] Assignee: FIAT Societa per Azioni, Turin, Italy

[22] Filed: July 22, 1971

[21] Appl. No.: 165,229

[30] Foreign Application Priority Data
Mar. 27, 1971  Italy .............................. 68040 A/71

[52] U.S. Cl. ..................... 303/7, 188/181 R, 303/6, 303/21 R
[51] Int. Cl. ............................................ B60t 13/00
[58] Field of Search ............ 303/21, 24, 6, 7; 188/181

[56] References Cited
UNITED STATES PATENTS

| | | | |
|---|---|---|---|
| 3,093,422 | 6/1963 | Packer et al. ...................... | 303/21 F |
| 3,479,094 | 11/1969 | Chovings ............................. | 303/7 |
| 3,503,654 | 3/1970 | Stamm................................. | 303/7 |
| 3,602,553 | 8/1971 | Cumming et al. ............... | 303/21 EB |
| 3,620,577 | 11/1971 | Neisch et al. ............................ | 303/7 |
| 3,667,813 | 6/1972 | Burckhardt et al............. | 303/21 EB |

*Primary Examiner*—Milton Buchler
*Assistant Examiner*—D. C. Butler
*Attorney*—Richard C. Sughrue, Robert V. Sloan et al.

[57] ABSTRACT

An anti-skid braking system for trailers which are to be towed by tractor vehicles having their own antiskid braking system is disclosed. In this system the extra expense of duplicating much of a tractor vehicle's antiskid braking system is a trailer is avoided by providing means for connecting the brakes of the trailer into the braking pressure circuit of tractor vehicle, means for modulating the braking pressure applied to the brakes of each wheel, and means for connecting the modulating means of each trailer wheel to the braking pressure control circuit of the vehicle. Preferably the trailer is coupled to receive the same breaking pressure modulating signals which are applied to the brakes of the rear wheels of the tractor vehicle, and preferably the left and right hand side of the trailer receive the signals respectively applied to the left and right hand side near wheels of the tractor vehicle.

1 Claim, 1 Drawing Figure

PATENTED SEP 4 1973
3,756,661
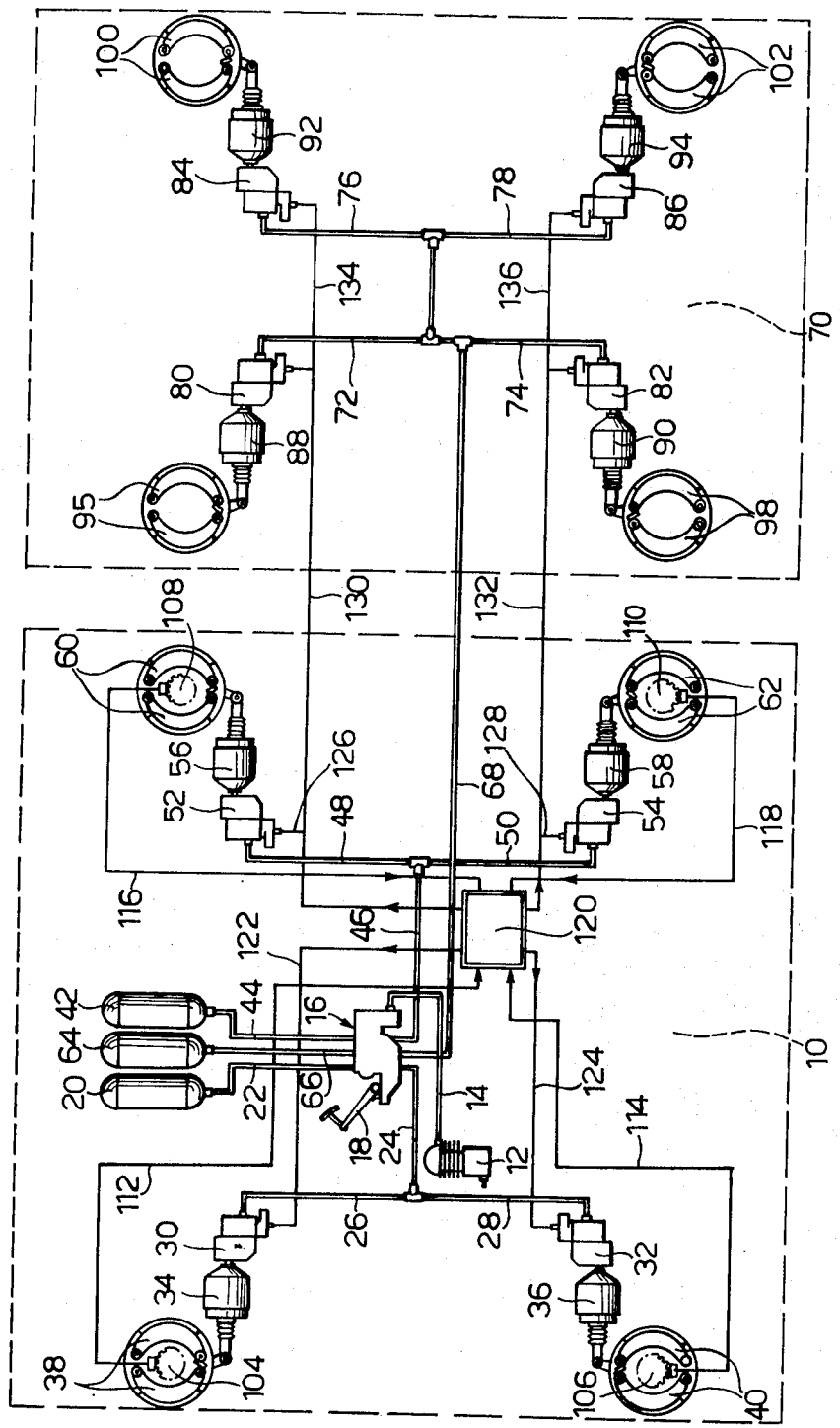
INVENTOR
GIANCARLO MICHELLONE
BY Sughrue, Rothwell, Mion,
Zinn & Macpeak
ATTORNEYS

ANTI-SKID BRAKING SYSTEM FOR TOWED VEHICLES

BACKGROUND OF THE INVENTION

The present invention relates to an anti-skid braking system for trailers. By the expression "trailer" it is intended to cover any type of vehicle drawn by a tractor vehicle and to include the towed part of an articulated vehicle.

Many motor vehicles are provided with one or more anti-skid control devices acting on the braking system to control the braking pressure applied to the brakes of the vehicle so as to prevent any of the wheels from locking or skidding during braking. When a motor vehicle of this type has a trailer connected to it which does not have any anti-skid braking system, the advantages offered by the anti-skid braking system of the motor unit are at least partly lost in the new tractor-trailer combination.

Although absence of an anti-skid system on the trailer does not produce a very substantial increase in the braking distance, locking of the wheels of the trailer may substantially reduce the manoeuvrability of the tractor-trailer combination. This is particularly important when the trailer is fully loaded.

It would be possible to solve this problem by installing one or more anti-skid devices on the trailer itself. Such devices comprise a tachometer recorder on the wheels of the vehicle and comples electrical circuits between the tachometer and the brakes. Such a solution is very expensive, however, since it entails duplication of much of the anti-skid apparatus on the tractor in any tractor-trailer combination.

OBJECTS OF THE INVENTION

One object of this invention provide an anti-skid braking system for trailers which may substantially increase the manoeuvrability of a tractor-trailer combination during braking.

Another object of this invention is to produce an anti-skid braking system of the above-mentioned type for trailers, at an acceptable cost.

SUMMARY OF THE INVENTION

According to the present invention there is provided an anti-skid braking system for a trailer connectable to a tractor vehicle having an anti-skid braking system of the type comprising pressure generating means, pressure controlled braking means for each wheel, electronic anti-skid control means associated with at least one wheel, and electrically controlled pressure modulating means, controlled by the anti-skid control means, for the braking means of each wheel, the pressure modulating means being electrically connected to and controlled by the anti-skid control means, in which each trailer wheel is provided with braking means connectable to the pressure generating means of the tractor vehicle, and pressure modulating means connectable to the anti-skid control means so as to be controlled thereby.

Further objects and advantages of the invention will become apparent from the following description with reference to the accompanying drawing, which is given merely as an example without limitations.

BRIEF DESCRIPTION OF THE DRAWING

The drawing is a partially diagrammatic plan view of a tractor-trailer combination equipped with an anti-skid constructed in accordance with this invention.

DESCRIPTION OF THE PREFERRED EMBODIMENT

In the drawing there is shown a pneumatic braking system for a motor vehicle 10, comprising a compressor 12 connected by a conduit 14 to a pneumatic distributor valve 16 controlled by a pedal 18. Operation of the pedal 18 controls a braking circuit comprising a container 20 connected to the distributor 16 by a conduit 22, and a delivery conduit 24 branching into conduits 26 and 28 respectively for the right hand and left hand fron wheels of the vehicle. The conduits 26 and 28 are coupled via respective electro-pneumatic valves 30, 32 to pneumatic actuators 34, 36 which respectively operate the brakes 30, 40 of the two front wheels (not shown) of the vehicle.

An identical braking circuit for the rear wheels of the motor vehicle comprises a container 42 connected by a conduit 44 to the distributor 16; and a delivery conduit 46 branching into two conduits 48, 50 respectively for the right and left hand rear wheels of the motor vehicle. The conduits 48, 50 are respectively connected to electro-pneumatic valves 52, 54 which are in turn connected to respective actuating devices 56, 58 which actuate the brakes 60, 62 of the rear wheels (not shown).

A further pneumatic circuit is provided for a trailer 70. The trailer circuit comprised a container 64 connected by a conduit 66 to the distributor 16, and a delivery conduit 68 for the wheels of the trailer 70 which is connected to the motor vehicle 10 by means not illustrated. The conduit 68 branches out into four conduits 72, 74, 76, 78 which feed respective brakes 96, 98, 100, 102 via respective electro-pneumatic valves 80, 82, 84, 86 and respective pneumatic actuators 88, 90, 92, 94.

The motor vehicle 10 is also provided with an anti-skid system comprising a respective tachometer recorder 104, 106, 108, 110, for each of the wheels of the motor vehicle; the tachometer recorders are connected by respective cables 112, 114, 116, 118, to an electronic network 120 which combines the signals provided by each tachometer with those from an accelerometer (not shown) to determine the acceleration or deceleration of the vehicle and to produce signals for controlling the braking pressure in a manner known in itself and described in various prior patents. Conveniently the tachometer recorders are of the phonic wheel type.

The four control signals produced by the network 120 for each of the four wheels of the motor vehicle are applied through respective cables 122, 124, 126, 128 to the respective electro-pneumatic valves 30, 32, 52, 54, of the four wheels, to modify the braking pressure so as to avoid locking the wheels.

When the motor vehicle 10 has the trailer 70 connected to it, the braking system of the trailer is connected through the conduit 68 to the distributor 16 of the motor vehicle, and the electro-pneumatic valves 80, 82, 84, 86 of the four wheels of the trailer are connected via the cables 130, 132, 134, 136, respectively to cable 126, 128, which respectively carry the control signals of the right hand rear wheel and left hand rear wheel of the motor vehicle.

In this way the braking pressure on the wheels of thr trailer 70 will at all times be the same as the pressure on the rear wheels of the motor vehicle 10. Since ground conditions for either the right hand side, or for the left hand side of the combination are mainly constant over the area occupied by the wheels of a combination comprising a motor vehicle and trailer, other than the steering wheels, the required variation of braking pressure will be the same for the rear wheels of the motor vehicle and also for the wheels of the traler.

Naturally, if the motor vehicle braking system is such that a single control signal modulates the braking pressure in both the rear wheels of a motor unit, such single signal will also modulate the braking pressure on all four wheels of the trailer.

It will be appreciated how the principle of extension of the control signal to the wheels of a trailer, according to this invention, may also be used for trailers of more than four wheels, for example to trailers having six wheels, or alternatively articulated vehicles.

Finally, it will be apparent to those skilled in the art how the principles of this invention may be applied not only to the pneumatic braking system described by also to hydraulic braking systems.

I claim:

1. An anti-skid braking system for a trailer connectable to a tractor vehicle of the type having a plurality of wheels and an anti-skid braking system including braking pressure generating means, pressure controlled braking means for each wheel, electronic anti-skid control means associated with at least one wheel on each side of said tractor vehicle and electrically controlled pressure modulating means, said pressure modulating means and controlled by said anti-skid control means, said trailer having a plurality of wheels, each of said trailer wheels being provided with braking means, means for connecting said trailer wheel braking means to said tractor vehicle braking pressure generating means, each of said trailer wheel braking means being provided with pressure modulating means, means for connecting the pressure modulating means of said trailer wheel braking means on one side of said trailer to the anti-skid control means associated with the same side of said tractor and means for connecting the pressure modulating means of said trailer wheel braking means on the other side of said trailer to the anti-skid control means for the other side of said tractor. means, means for connecting said trailer wheel braking means to said tractor vehicle braking pressure generating means, each of said trailer wheel braking means being provided with pressure modulating means, means for connecting the pressure modulating means of said trailer wheel braking means on one side of said trailer to the anti-skid control means associated with the same side of said tractor and means for connecting other side of said trailer to the anti-skid control means for the other side of said tractor.

* * * * *